Feb. 23, 1937.  B. F. FITCH  2,071,620
CONVERTIBLE VEHICLE
Filed Dec. 14, 1934  3 Sheets-Sheet 1
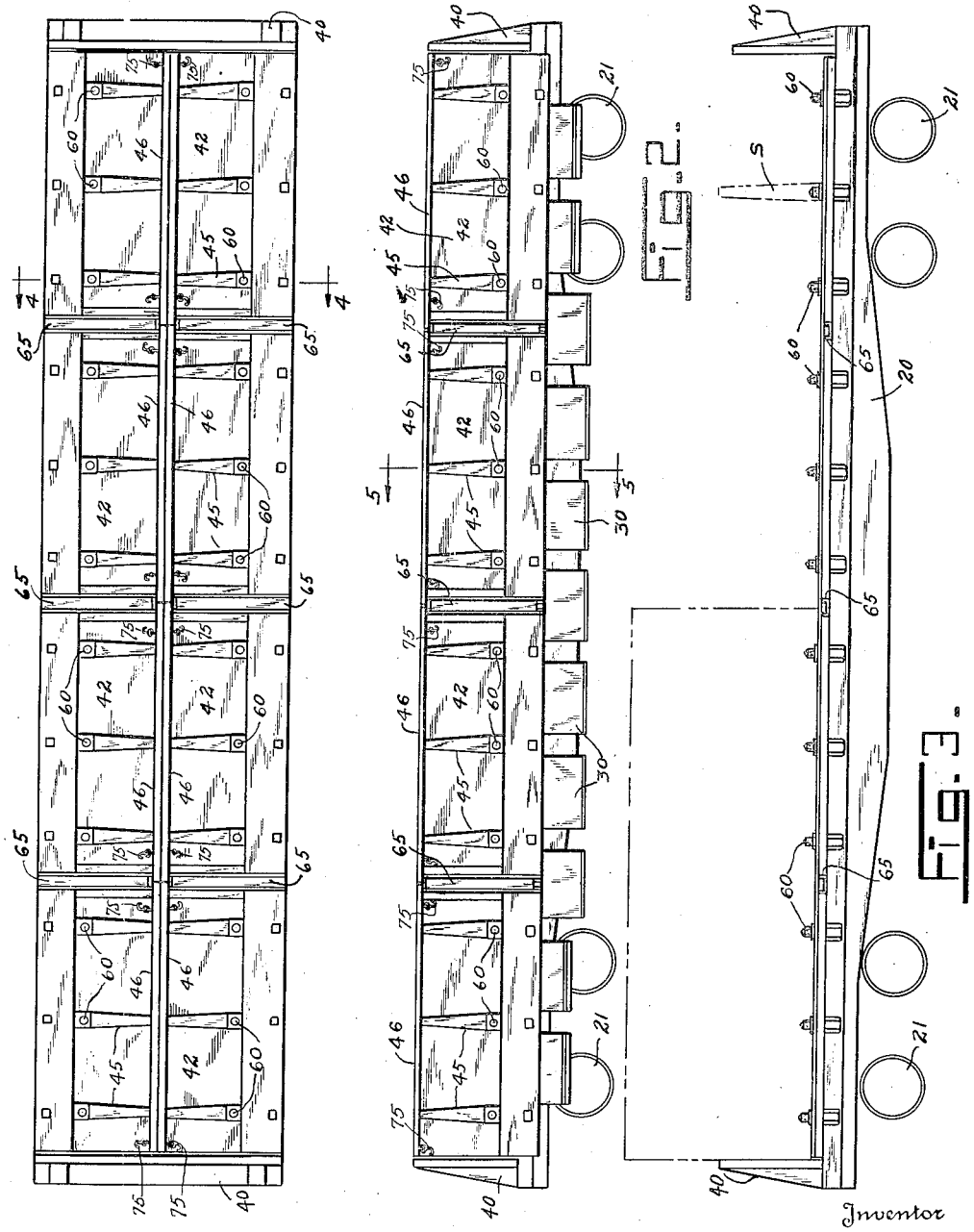
Inventor
Benjamin F. Fitch
By Bates, Golrick & Team
Attorneys

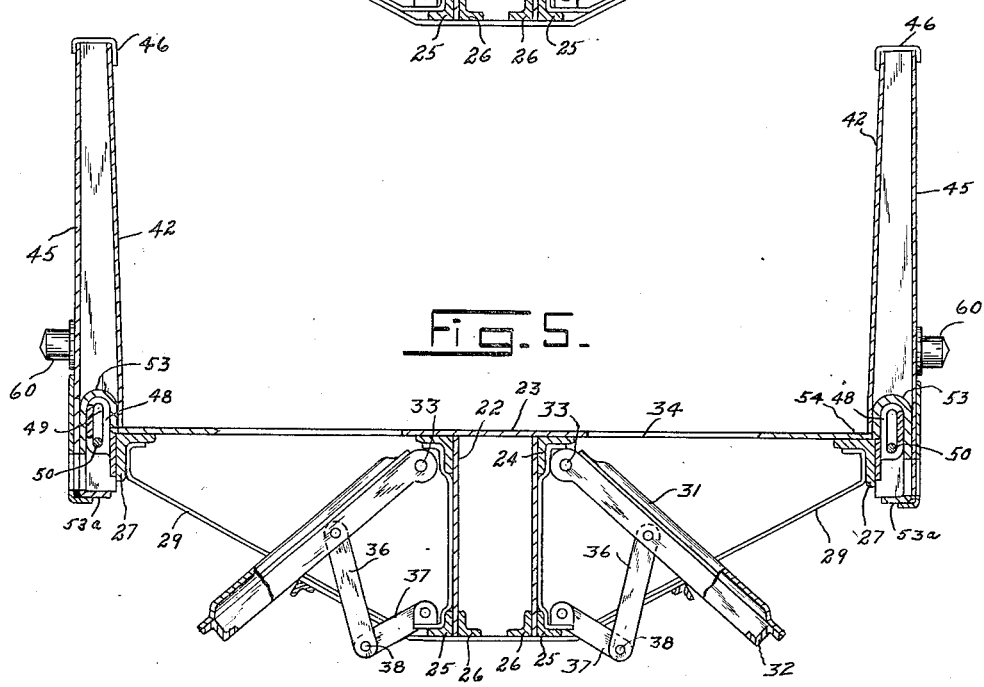

Feb. 23, 1937. B. F. FITCH 2,071,620
CONVERTIBLE VEHICLE
Filed Dec. 14, 1934 3 Sheets-Sheet 3
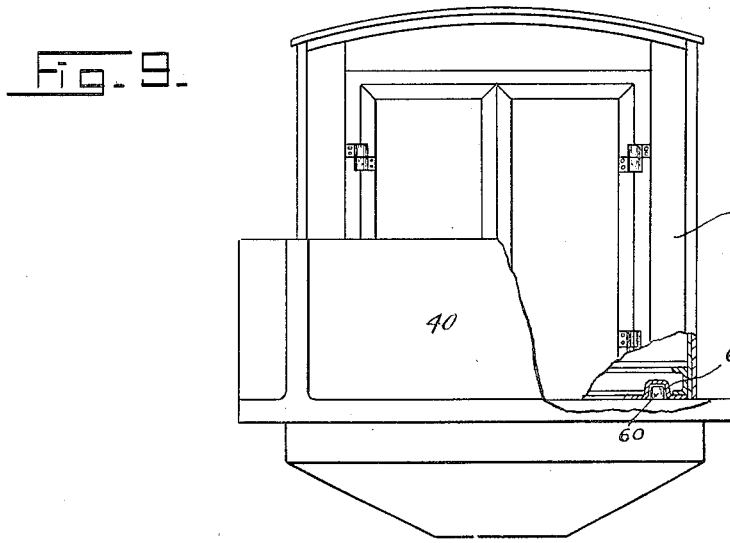
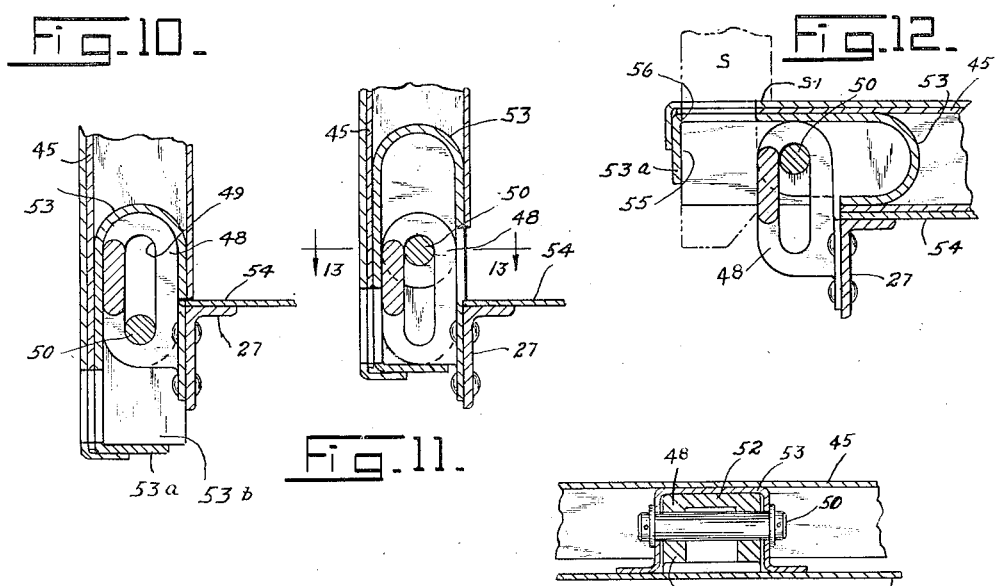
Inventor
Benjamin F. Fitch,
By Gates Golrick Hear
Attorneys Patented Feb. 23, 1937

2,071,620

UNITED STATES PATENT OFFICE 2,071,620

CONVERTIBLE VEHICLE

Benjamin F. Fitch, Greenwich, Conn., assignor to Motor Terminals Company, New York, N. Y., a corporation of Delaware Application December 14, 1934, Serial No. 757,534

23 Claims. (Cl. 105—243)

This invention relates to vehicles adapted to carry freight in bulk or in suitable containers such as demountable bodies. More particularly it refers to an all-purpose railroad car or other freight handling equipment to be used in transporting demountable vehicle bodies of various dimensions, and the commodities which lend themselves to loading therein, as well as to provide a car for the transportation of commodities which do not lend themselves to loading in a particular container. For example, a vehicle constructed in accordance with this invention may be interchangeably used to carry either demountable bodies thereon or loose freight, such as lumber, logs, structural steel and rails. Further, a car embodying the principles of my invention, may be used for the transportation of bulk material, such as iron or coal, crushed stone and like substances.

In the past, it has been customary to provide a freight car for each particular type of freight to be carried. Thus, package freight has often been carried in ordinary box cars, while such freight as structural members, lumber and steel rails has been transported on flat cars, such material being retained upon the car by stakes inserted in suitable pockets carried by the car frame. Such a flat car, without the use of the stake, was also used for the transportation of bulky matter, such as machinery, large building blocks, and similar unwieldy objects. It has also been common practice to provide still another type of freight car, namely, the "gondola car" with a dump bottom, the same being used for the transportation of iron, coal or crushed stone and similar substance in bulk.

The use of these several kinds of equipment necessitates the investment of large amounts of money in various types of railroad cars, each having similar under-frames and running gear, while many such special car units are utilizable in profitable transportation only during brief periods of each year, thus causing depreciation costs to mount while the cars remain idle.

An object of my invention has been to provide an all-purpose car to transport such various commodities as desired, such a car being readily adaptable to retain thereon any chosen type of freight.

A more specific object of my invention has been to provide a railroad car embodying a construction which may be readily altered to allow the car to be used as a flat car or a gondola car, as desired.

Still another object of my invention has been to provide a railroad car having suitable members to engage and support a demountable vehicle body thereon, such members being removable to an idle position when not in active use.

It is to be understood that although I have shown in the drawings a railroad flat car as embodying the features of my invention, a motor truck or other type of vehicle might be built incorporating these various elements, and the use of the features hereinafter described and claimed is to be considered as a part of my invention when employed on any other vehicle.

Referring now to the drawings, Fig. 1 represents a plan of a railroad car incorporating the features of my invention having the car sides turned downwardly to form a flat car; Fig. 2 is a side elevation of such a railroad car, having the sides vertical to form a gondola car; Fig. 3 is a side view of a similar car with the sides down to form a flat car adapted to carry a demountable vehicle body but without the hopper features of a gondola car; Fig. 4 is a transverse section through the railroad car, as indicated by the line 4—4 of Fig. 1; Fig. 5 is a transverse section as indicated by the line 5—5 of Fig. 2, showing the car in use as a gondola, with the chutes open; Fig. 6 is a fragmentary side section of one of the posts used to link together adjacent sections of the car sides; Figs. 7 and 8 are transverse sections through the posts of Fig. 6, as indicated by the lines 7—7 and 8—8 of Fig. 6, respectively; Fig. 9 is a broken end elevation of my railroad car, showing the upstanding end, a demountable body on the car, and a socket and mating positioner retaining the body on the car; Fig. 10 is an enlarged fragmentary section of a portion of Fig. 5, showing the manner in which the sides of the car are retained in an upright position; Fig. 11 is a section similar to Fig. 10, but showing the sides lifted preliminary to being folded over to form a flat car top; Fig. 12 shows the sides of Figs. 10 and 11 folded over to form a horizontal flat top on the understructure of the car; Fig. 13 is a transverse section through the side, as indicated by the line 13—13 of Fig. 11.

In general, my invention is shown as applied to an ordinary railroad car frame which may be provided along the bottom on both sides of the longitudinal center lines with chutes which may be opened or closed as necessary for the handling of crushed stone and similar materials in the car. Sides are provided for the car and are carried by spaced reinforcing beams which, in turn, are pivotally retained at the side edges of the car. These reinforcing beams and the siding fastened thereto are normally held in vertical position but are adapted to be raised to free them from the holding means and then folded over to lie flat on the understructure of the car, forming what may be described as substantially a flat car. When the side is in this position, suitable upstanding projections carried thereby face upwardly to retain in position demountable vehicle bodies deposited thereon.

These folding car sides are preferably made in several sections along each side of the car, and for this reason posts are provided adjacent adjoining side sections to brace the sides. These posts may, if desired, act as retaining means for lumber or structural members when the side is folded flat. However, I prefer to mount the posts pivotally so that they may be folded down horizontally after the car sides are folded.

The ends of the car are provided with permanent upstanding end walls to complete the gondola structure when the foldable sides and posts are raised.

A suitable understructure of the car is generally indicated at 20 in Figs. 2, 3, 4, and 5, and is carried by the usual trucks having wheels 21. As shown in Fig. 4, this under-frame may be built up of suitable structural members, comprising generally a centrally located box girder extending the length of the car. This girder may be formed of a pair of plates 22, standing on edge with a second plate 23 resting on top of them and fastened thereto. Suitable angles 24 lie against the plates 22 and 23 to reinforce the girder construction. At the bottom of each member 22 an inner and outer angle 25 and 26 respectively, is shown, to give additional strength to the structure. Inturned angles 27 are provided, forming the outer edge of the body understructure and extending lengthwise thereof. These angles and the box girder construction are joined together by a suitable top 28 and bottom reinforcing members 29.

Hoppers may be provided to allow the ready removal of bulk material from the bottom of the car. Such hoppers are shown at 30 in Fig. 2, although their presence is not necessary, as indicated by the construction of Fig. 3. These hoppers in general comprise doors 31, carried on a door frame 32, pivoted at 33 to the understructure 20 and adapted to close openings 34 formed in the top 28 of the understructure.

The hopper doors may be raised to closed position by any suitable mechanism shown conventionally as including a pair of toggle links 36 and 37 pivoted together at 38 and pivoted at their free ends to the door and the understructure respectively. When the toggle is straightened by suitable means (not shown) the door is raised to closed position and may be there held by any suitable latch (not shown). The release of the latch and the buckling of the toggle will enable the door to drop and discharge the cargo resting on it.

When this all-purpose freight car is to be used as a gondola the sides and posts are raised and in cooperation with the ends form a continuous boundary wall, thus presenting a box-like construction which may act as a depository for the bulk material to be carried. I have shown the ends as permanent upstanding walls 40.

The car sides are so constructed that they may stand upright or be folded to provide either a gondola or flat car. These sides comprise plates 42, carried by reinforcing beams 45, and surmounted along their upper edge by reinforcing channel members 46. Each car side is composed of several sections which may be folded independently of each other, if desired. Fig. 2 shows four such side sections provided on each side of the car.

The beams 45 secured to the side plates 42 are foldably carried by the understructure of the car. Upstanding brackets 48 are provided at spaced intervals along the car sides at the edge, extending above the flat top 28. These brackets 48 each carry a slot 49 extending vertically and adapted to accommodate a pin 50, slidable therein, carried by the beam 45. As shown in Fig. 13, the bracket 48 is U-shaped in cross-section comprising two side members 51 and a back member 52.

Each beam 45 rigidly carries an inverted receptacle 53 adapted to fit over the bracket 48 to retain the beam in an upright position. This receptacle is in the form of a downwardly facing socket to closely embrace the member 48 as it rests thereon. It is to be noted that when the beam 45 is in the position shown in Fig. 10, by virtue of the close fit of the socket 53 with respect to the member 48, substantially no play is possible between the two, thus holding the beam upright and effectively rigid with respect to the underframe of the car.

The beams 45 and the sides 42 associated therewith are folded down by first raising the same until the pin 50 which is carried fixedly by the beam 45 strikes the top of the slot 49 of the bracket 48. At this time the receptacle 53 has been withdrawn as shown in Fig. 11, and the beam may be swung about the pin 50 ninety degrees until it rests on top of the portion 28 of the underframe 20 of the car at which time the position shown in Fig. 12 will have been assumed.

It will be noted that in the folded position, the beam 45 provides an upwardly opening stake pocket 55, as shown in Fig. 12. This pocket is in the nature of a square hole cut in the beam 45, as indicated at 56. The stakes pass through these square holes and are prevented from tipping, by reason of the overturned flange 53a of the receptacle 53 acting in conjunction with the portion 52 of the bracket 48. Tipping in an opposite direction is prevented by the sides of the receptacle 53, which project downwardly to complete the stake pocket as at 53b. By reason of an overlying ledge 51 on the stake the same is prevented from dropping through the stake socket.

In addition to positioning a stake socket when the side 42 is folded over onto the car, upstanding projections 60 are positioned for use. These projections are adapted to mate with sockets 63 carried by a demountable body B as shown in Fig. 9, which is to be carried on the flat car. The members 60 are preferably formed with a conical top and cylindrical side surface, the former being adapted to guide the body into position over the projection 60 and the cylindrical surface being adapted to retain the body in position when so deposited. As shown in Fig. 9, the socket 63 is carried within the base of the demountable body B and is rigidly fastened thereto.

To provide bracing for the sides 42, as well as a seal between adjacent siding portions, upright posts 65 (Fig. 6) are provided. The posts 65 are in the form of I-beams, having a web and edge flanges. A pin 66 passes through the web and is seated in brackets 68 which in turn are rigidly fastened to the angle 27 of the car underframe 20, thus providing a rigid pivot point for the post 65.

It is to be noted that the outer flanges of the I-beam forming the post extend downwardly a sufficient distance to engage the base portion of the bracket 68 and prevent the post being swung outwardly past an upright position. The post is prevented from folding downwardly onto the body by the siding 42 which is raised thereafter and bears against the I-beam as shown at 69 of Fig. 7. The overlapping portion 69 is conveniently formed of a Z-bar 70, suitably fastened to the general side walls.

When the side wall beams 45 stand in the position shown in Fig. 11, the channel 46 stands above the adjacent individual posts 65, and when the siding is dropped to the position shown in Fig. 10, the flanges of the channel 46 overly the top of the post 65 and firmly link the two together.

To avoid interference of the post 65 with the channel 46 when the side walls are folded downwardly, the pin 66 is so located that the post 65 may be directly folded, the free end extending the same distance beyond the pin 66 when folded as when opened. On the other hand, the beam 45 and the side wall fastened thereto must first be raised before being folded, as shown in Figs. 10 and 11, and thus they extend inwardly when lying flat a greater distance than do the posts 65, avoiding interference between the top of the posts and the channel 46 of the adjacent side wall.

It is to be understood that when the invention is embodied in a full-sized railway car the sectional sides are too heavy for convenient manual manipulation, but may be readily raised and moved from vertical to horizontal position and vice-versa, by any convenient overhead hoist mechanism. For the ready attachment of such hoist, I prefer to provide attaching means secured to the outer faces of the side panels adjacent the ends thereof. Such attaching devices are indicated as conventional hooks at 75 in Figs. 1 and 2 of the drawings.

It will be seen from the foregoing description that I have provided a vehicle, not necessarily limited to a railroad car, which is readily adaptable for the transportation of different kinds of freight, including demountable bodies loaded with commodities. On the other hand, the car may be adapted to transport bulk materials, such as iron ore and coal, or, if desired, lumber, structural members or similar long and narrow articles may be transported. If further desired, the car is readily adaptable to transport large, bulky articles, such as heavy machinery, which cannot readily be packed or crated.

I claim:

1. The combination of a vehicle adapted to support a demountable freight container, load retaining means having a positioning device adapted to rest on the vehicle and coact with the container, and a connection between the said means and the vehicle so arranged that the positioning device may stand over a platform on the vehicle in position to engage the container or may be moved laterally to free the container platform for the retaining of other freight by said means.

2. The combination with a vehicle, a member hinged to the side edge thereof and adapted to overlie a platform on the vehicle or be held in a vertical position beyond the edge of such platform, and a projection on the member adapted to extend upwardly when the member is lying on the platform and thus coact with a socket in a demountable freight container above the platform.

3. A convertible vehicle having a substantially flat top surface, a movable member adapted to extend vertically or be swung into a substantially horizontal position over said surface, and a positioner carried by said member for a freight container adapted to stand above the member when horizontal.

4. The combination of a railway car having sides hinged thereto in such manner that they may stand substantially vertically or be tipped down into substantially horizontal position, and positioning devices carried by said car sides and adapted to coact with a freight container resting on the turned down sides.

5. The combination of a railway car having sides hinged thereto in such manner that they may stand substantially vertically or be tipped down into substantially horizontal position, projections rigidly carried on the outer surfaces of said car sides and adapted to coact and occupy sockets in the base of a freight container resting on the turned down sides.

6. The combination with a railway car of a side therefor, comprising an inner sheet and substantially vertical cross beams on the outer side of the sheet, and projections secured to the cross beams and extending in a direction away from said sheet, said side being so attached to the car that it may stand substantially vertically or be folded down into a horizontal position with the projection extending upward.

7. In a convertible car, the combination, with the underframe and means adapted to constitute a floor for the car, of sides hinged to the car at opposite sides by pin and slot engagement, whereby the side when vertical may be lifted a short distance, means adapted to engage the lower portion of the side for normally holding the side in its vertical position but adapted to free the side when it is lifted vertically, said sides after being so lifted being adapted to be swung down into substantially horizontal position overlying the normal floor of the car.

8. The combination, with a vehicle underframe, of a bracket carried thereby and having an upwardly extending portion at the side edge of the underframe, a vehicle side having an inverted receptacle embracing the top of the bracket and limiting the downward movement of the side, whereby the side may be normally held in vertical position but may be released by a predetermined lifting movement.

9. In a convertible car, the combination with the underframe of a bracket carried thereby and having an upwardly extending loop at the side edge of the underframe, a car side having pins extending through the loops of the brackets and having inverted receptacles embracing the tops of the brackets, whereby the side may be held in vertical position or released by a predetermined lifting movement, and thereupon may be turned into a horizontal position over the underframe.

10. In a convertible car, the combination of an underframe, brackets secured to the opposite longitudinal edges of the frame and each having a vertical loop, a car side carrying a downwardly facing U-shaped receptacle adapted to embrace said loop to hold the side in vertical position, said side carrying horizontal pins occupying the openings of the loop to limit the movement of the side relative to the bracket and to form a shiftable pivot for the side, said sides being adapted to be turned down into substantially horizontal position above the floor frame after they have been elevated sufficiently to cause the receptacles to clear the brackets.

11. The combination with a vehicle underframe of brackets carried at the sides thereof, vehicle sides each in the form of an inner sheet with cross beams rigidly secured to the outer side thereof, said cross beams extending vertically when the car side is vertical, means carried by each cross beam coacting with the respective bracket for normally holding the side vertical and arranged to enable release of the side from the bracket by lifting of said sides.

12. In a railway car, the combination of an underframe having side sills, brackets secured to the side sills and providing upwardly extending loops, car sides each composed of inner sheets and hollow cross beams, downwardly facing receptacles within the cross beams adapted to coact with the looped portions of the brackets to hold the sides and beams vertical, pins carried by the cross beams and extending through the loops whereby the side is adapted to be lifted a short distance in its own plane to cause the receptacle of the beam to be released from the bracket, whereupon the side may be folded inwardly to a substantially horizontal position over the car frame.

13. A convertible vehicle comprising a platform, sectional walls hinged thereto, spaced from each other and adapted to lie substantially horizontally above the platform or be turned up to stand vertically in alignment with each other, and posts hinged to the platform and adapted to lie between and coact with the adjacent ends of successive sections to make therewith a substantially continuous wall.

14. In a vehicle, the combination of an underframe, sectional sides hinged thereto and adapted to stand vertically or be turned down horizontally, and posts independent of the side sections, hinged to the frame and adapted to stand vertically in coaction with adjacent sides, or be turned down horizontally over the floor frame with the sides, or serve as stakes when the sides are turned down.

15. In a convertible vehicle, the combination, with a platform, of sectional sides adapted to stand vertically or be turned down into a substantially horizontal position over the platform, posts adapted to coact with adjacent sides when vertical to outwardly overlap the same, said sides having top caps adapted to receive the tops of the posts.

16. In a convertible vehicle, the combination of an underframe, sectional sides hinged thereto by shiftable pivots in such manner that the sides may stand vertically at the edges of the frame and be held in such position or by being lifted slightly may become free and swung down over the platform, and posts hinged to the underframe on fixed pivots and adapted to coact with adjacent ends of the sides when vertical, said posts having their tops in underlapping relation with the tops of the sides when the sides and posts are vertical but having their tops clear the side tops when the sides and posts are turned down.

17. In a convertible car, the combination of the underframe, sectional sides hinged thereto, said sides having inner sheets and Z-bar uprights adjacent their edges, and posts hinged to the sides and adapted to occupy the space between the webs of the Z-bars of adjacent side sections.

18. In a convertible car, the combination of a platform, sides hinged thereto in such manner that they may be carried vertically adjacent the edges of the platform or turned down horizontally over the platform, and openings through the sides adapted to receive stake posts when the sides are horizontal.

19. In a convertible car, the combination, with the underframe having an edge sill, of brackets carried by said sill, a car side, means to form a shiftable pivot connection between the car side and the edge sill permitting reclination of the side, there being inwardly turned flanges at the lower edge of the side and openings through the face of the side adapted to accommodate stakes which extend downwardly inside of said flanges.

20. In a convertible car, the combination, with the underframe having an edge sill, of brackets carried by said sill, a car side having an inner plate and hollow posts, means carried by the hollow posts in coaction with the brackets to form a shiftable pivot connection between the car side and the brackets, there being inwardly turned flanges at the ends of the posts and openings through the face of the posts adjacent the brackets, said openings being adapted to accommodate stakes which extend downwardly between the post flanges and brackets when the side is horizontal.

21. A gondola railway car having a drop bottom floor and having its sides so supported that they may be folded down horizontally, over said floor, and normally idle projections on the outer face of the sides when the sides are vertical, said projections being adapted to stand vertically when the sides are horizontal and position demountable freight containers carried by the car, whereby an all-purpose car is provided.

22. In a convertible vehicle, the combination with a support of a positioning device adapted to enter a socket in the base of a demountable freight container adapted to be carried by the vehicle, and means for movably mounting the positioning device on a vehicle in such manner that it projects upwardly into such base socket of the freight container in one position, and is located out of range of such container in another position.

23. In a railway car having an underframe, a side wall having a pin and slot connection with the underframe operating to hold the side wall normally upright and in lateral abutment with the underframe in a manner to prevent swinging of the side wall about said connection, said pin and slot connection guiding the side wall for upward movement out of abutting relation to the underframe and into a position where the side wall may be swung inwardly over the car.

BENJAMIN F. FITCH.